United States Patent [19]

Stecura

[11] Patent Number: 4,535,033
[45] Date of Patent: Aug. 13, 1985

[54] THERMAL BARRIER COATING SYSTEM

[75] Inventor: Stephan Stecura, Parma, Ohio

[73] Assignee: The United States of America as represented by the Administrator of the National Aeronautics and Space Administration, Washington, D.C.

[21] Appl. No.: 640,712

[22] Filed: Aug. 14, 1984

Related U.S. Application Data

[63] Continuation-in-part of Ser. No. 523,297, Aug. 16, 1983, Pat. No. 4,485,151, and a continuation-in-part of Ser. No. 375,784, May 6, 1982, abandoned.

[51] Int. Cl.³ .......................... C23C 7/00; C23D 5/00; B32B 15/04
[52] U.S. Cl. .................................. 428/633; 428/656; 428/678; 428/679; 428/680; 428/681; 428/682; 428/683; 428/684
[58] Field of Search ................. 428/633, 656, 678, 685

[56] References Cited

U.S. PATENT DOCUMENTS

| | | | |
|---|---|---|---|
| Re. 24,242 | 12/1956 | Lohr | 75/171 |
| 3,432,314 | 3/1969 | Mazdiyasni et al. | 106/57 |
| 3,589,894 | 6/1971 | Roush | 75/171 |
| 3,869,779 | 3/1975 | Gedwill et al. | 428/678 |
| 3,957,500 | 5/1976 | Pitts | 106/57 |
| 4,095,003 | 6/1978 | Wertherly et al. | 428/633 |
| 4,101,715 | 7/1978 | Rairden | 428/652 |
| 4,162,918 | 7/1979 | Huseby | 75/171 |
| 4,205,051 | 5/1980 | Takahashi et al. | 423/266 |
| 4,313,760 | 2/1982 | Dardi et al. | 428/678 |
| 4,485,151 | 11/1984 | Stecurd | 428/633 |

OTHER PUBLICATIONS

Stecura, S. , Effects of Compositional Changes of the Performance of a Thermal Barrier Coating System, NASA Tech. Man., 78976, 1979.

Primary Examiner—Veronica O'Keefe
Attorney, Agent, or Firm—Gene E. Shook; John R. Manning

[57] ABSTRACT

An oxide thermal barrier coating comprises $ZrO_3$—$Yb_2O_3$ that is plasma sprayed onto a previously applied bond coating. The zirconia is partially stabilized with about 12.4 w/o ytterbia to insure cubic, monoclinic, and tetragonal phases.

10 Claims, 1 Drawing Figure

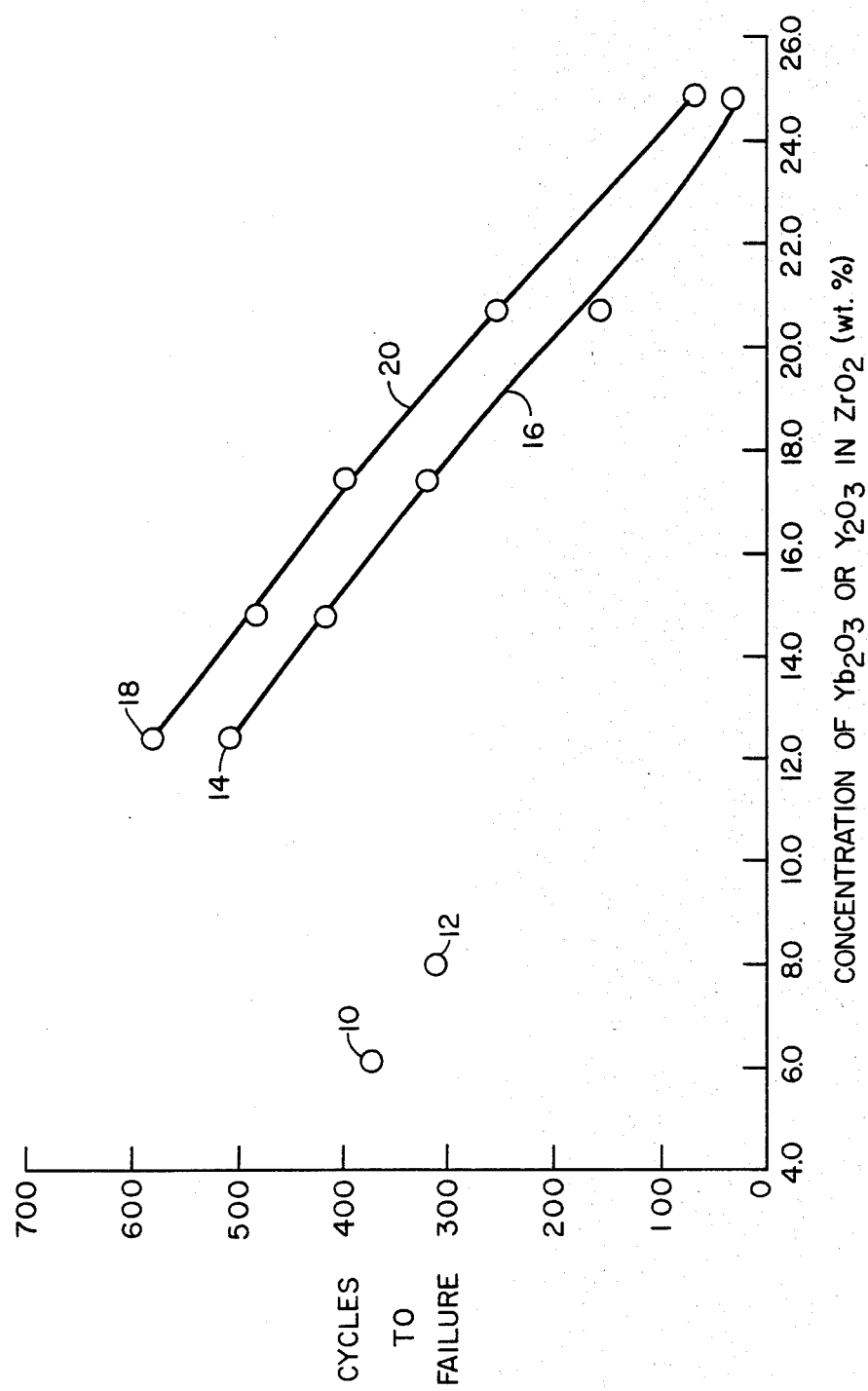

THERMAL BARRIER COATING SYSTEM

ORIGIN OF THE INVENTION

The invention described herein was made by an employee of the United States Government and may be manufactured and used by or for the Government for governmental purposes without the payment of any royalties thereon or therefor.

RELATED APPLICATIONS

This application is a continuation-in-part of copending application Ser. No. 523,297 which was filed Aug. 16, 1983 and is now U.S. Pat. No. 4,485,151, and is a continuation-in-part of application Ser. No. 375,784 which was filed May 6, 1982 and is now abandoned.

TECHNICAL FIELD

This invention relates to high temperature oxidation resistant thermal barrier coating systems for nickel-, cobalt-, or iron-base alloy substrates. Such coating systems can be used on components of gas turbine engines and combustors or in other high temperature applications.

Oxide coatings are normally applied by flame or plasma spraying. Thermal barrier coating systems composed of bond and thermal barrier oxide coatings have been used on the X-15 aircraft, as set forth in copending application Ser. No. 523,297 now U.S. Pat. No. 4,485,151. Also, such systems have been used on vanes and blades in a J-75 research engine, and in the combustors of many military and commercial aircraft gas turbines.

Stabilized zirconia was developed and used as a protective coating, and there has been a continuous endeavor to improve the performance of oxide thermal barrier coatings. Such coatings as CaO—, MgO—, and $Y_2O_3$ stabilized zirconia have been tested. Of these, $Y_2O_3$—partially stabilized zirconia has provided the best results as set forth in copending application Ser. No. 523,297, which issued as U.S. Pat. No. 4,485,151.

It is, therefore, an object of the present invention to provide thin layers of oxide coating on the surfaces of turbine blades, vanes, and other power system components to enable these devices to be operated at significantly higher cycle temperatures than with bare metallic parts.

BACKGROUND ART

Mazdiyasni et al U.S. Pat. No. 3,432,314 describes polycrystalline cubic zirconia that is fully stabilized with ytterbium oxide. The material has a very high density resulting in high transparency, but the material would not be satisfactory for a thermal barrier coating.

Lohr U.S. Pat. No. Re. 24,242 describes a nickel-chromium-iron alloy that is used as an electrical resistance element. A "Misch Metal" having an approximate composition of 45% cerium, 30% lanthanum, 20% ytterbium and didymium is added to this alloy.

Roush U.S. Pat. No. 3,589,894 describes a sulfidation resistant cobalt-base alloy containing chromium, aluminum, and a metal selected from the group consisting of scandium, lanthanum, and a lanthanide series metal. Ytterbium is mentioned as one of the lanthanide series.

Pitts U.S. Pat. No. 3,957,500 discloses a method of stabilizing zirconia to produce refractory bricks, sheets and other shapes. Zirconia is combined with high yttria plus a heavy rare earth metal oxide concentrate containing about 50–65% yttria, 30–35% heavy rare earth metal oxides, and about 1–5% impurities. Ytterbia may be one of the heavy rare earth metal oxides.

Takashashi et al U.S. Pat. No. 4,205,051 is concerned with a compound comprising zirconia stabilized with scandium oxide and ytterbia. The compound is an oxygen ion-conductive solid electrolyte.

DISCLOSURE OF INVENTION

The high temperature thermal barrier coating of the present invention comprises $ZrO_3$—$Yb_2O_3$. This coating is applied by plasma spraying, and no special cover gas or inert atmosphere chamber is required.

The oxide thermal barrier coating covers a previously applied bond coating. MCrAl—Y and/or MCrAl—Yb bond coatings have been satisfactory.

The resulting oxide thermal barrier coating systems may be used at very high temperatures. The $ZrO_2$—$Y_2O_3$ thermal barrier coating of the present invention has significantly greater cycle life than a conventional $ZrO_2$—$Y_2O_3$ thermal barrier coating.

BRIEF DESCRIPTION OF THE DRAWING

The details of the invention will be described in connection with the accompanying drawing which is a graph showing furnace cycles to failure plotted against the concentration of yttria or ytterbia in zirconia thermal barrier coatings.

BEST MODE FOR CARRYING OUT THE INVENTION

A number of nickel base alloy substrates were coated in accordance with the present invention. The coated substrates were then cyclic furnace tested to determine the effect of the concentration of ytterbia or yttria in the zirconia.

Each substrate was first covered with either a NiCrAl—Y or a NiCrAl—Yb bond coating that was plasma sprayed at 400 amperes and 29 volts. A zirconia thermal barrier coating stabilized with either yttria or ytterbia was then plasma sprayed onto the bond coating at 600 amperes and 31 volts. In this manner a two layer thermal barrier coating system was provided which comprised two distinct layers; the first being a bond coating and the second being an oxide thermal barrier coating.

A $ZrO_2$—$Yb_2O_3$ thermal barrier coating was tested in a cyclic furnace at the same time as a $ZrO_2$—$Y_2O_3$ coating. This provided for a comparison of the two coatings.

Each cycle included a nine minute heat up to an upper elevated temperature of about 1110° C. (2030° F.) which was maintained for 60 minutes. This was followed by 60 minutes of cooling to about 300° C. (572° F.).

The substrates were first covered with a bond coating having a nominal composition of Ni—17 w/o Cr—6 w/o Al—0.15 w/o Y or 0.22 Yb. Such a bond coating is discussed in copending application Ser. No. 523,297, now U.S. Pat. No. 4,485,151.

One of these substrates having a Ni—16.5 Cr—5.92 Al—0.15 Y bond coating was covered with a $ZrO_2$—6.1 w/o $Y_2O_3$ thermal barrier coating. This coating withstood 372 furnace cycles and is indicated by the point 10 on the graph.

Another substrate coated with the same bond coating was covered with a $ZrO_2$—8.0 w/o $Y_2O_3$ thermal barrier coating. This coating withstood 310 one-hour cycles and is indicated by the point 12 on the graph in the figure. Still another substrate was coated with the same bond coating and a $ZrO_2$—12.4 w/o $Yb_2O_3$ thermal barrier coating. This system withstood 508 one-hour furnace cycles as indicated by the point 14 in the drawing. The concentration of ytterbia in the $ZrO_2$ thermal barrier coating was increased, and the number of cycles to failure in the furnace test decreased as shown by the line 16 in the Figure.

A substrate with a Ni—17.5 w/o Cr—6.60 w/o Al—0.22 w/o Yb bond coating was covered with a $ZrO_2$ —12.4 w/o $Yb_2O_3$ thermal barrier coating. This system withstood 580 one-hour cycles as shown by the point 18 in the figure. The desirability of using ytterbium instead of yttrium in the bond coating is discussed in copending application Ser. No. 523,297, now U.S. Pat. No. 4,485,151.

The concentration of ytterbia in the $ZrO_2$ thermal barrier coating on this bond coating was increased as shown by the line 20. This increase in ytterbia likewise decreased the number of furnace cycles to failure. Both the lines 16 and 20 clearly show the criticality of utilizing partially stabilized zirconia consisting of cubic, monoclinic, and tetragonal phases.

The thermal barrier coating systems having ytterbia stabilized zirconia are superior to those having yttria stabilized zirconia as shown by lines 16 and 20 in the drawing. By way of example, the $ZrO_2$—12.4 $Yb_2O_3$ shown by the point 18 is at least 36 percent better than the best $ZrO_2$—$Y_2O_3$ system shown by the point 10.

The graph shows that the zirconia stabilized with ytterbia is significantly better than the zirconia stabilized with yttria. Moreover, the ytterbia stabilized zirconia thermal barrier oxide coating behaves similarly to the yttria stabilize zirconia, but it has longer life.

Furthermore, the ytterbia stabilized zirconia does not require matching of the thermal expansion coefficient of the substrate with the thermal expansion coefficient of the oxide through the thermal expansion gradation in the bond coating. No thermal expansion gradation in the bond coating is necessary. Thus, a two layer thermal barrier system comprising two distinct layers is produced.

While the preferred embodiment of the invention has been described it will be appreciated that various modifications may be made to the thermal barrier coating system without departing from the spirit of the invention or the scope of the subjoined claims.

I claim:

1. A coated article of manufacture having a duplex thermal barrier coating system comprising
   a substrate of a metal selected from the group consisting of nickel-base, cobalt-base, and iron-base alloys,
   a bond coating covering said substrate, said bond coating consisting essentially of an alloy containing chromium, aluminum, a rare earth selected from the group consisting of yttrium and ytterbium with a metal selected from the group consisting of nickel, cobalt, and iron, and
   a thermal barrier coating covering said bond coating, said thermal barrier coating consisting essentially of zirconia partially stabilized with ytterbia.

2. A coated article of manufacture as claimed in claim 1 wherein the bond coating contains between about 16.5 w/o to about 17.5 w/o chromium, and about 5.9 w/o to about 6.6 w/o aluminum.

3. A coated article of manufacture as claimed in claim 2 wherein the bond coating contains about 0.15 w/o yttrium.

4. A coated article of manufacture as claimed in claim 3 wherein the zirconia thermal barrier coating contains about 12.4 w/o ytterbia.

5. A coated article of manufacture as claimed in claim 2 wherein the bond coating contains about 0.22 w/o ytterbium.

6. A coated article of manufacture as claimed in claim 5 wherein the zirconia thermal bearing coating contains about 12.4 w/o ytterbia.

7. An improved thermal barrier coating system for covering a substrate comprising
   a bond coating covering said substrate, and
   a coating of zirconia partially stabilized with ytterbia covering said bond coating.

8. An improved thermal barrier coating system as claimed in claim 7 wherein the zirconia coating contains about 12.4 w/o ytterbia.

9. An improved thermal barrier coating for protecting a substrate comprising zirconia partially stabilized with ytterbia.

10. A thermal barrier coating as claimed in claim 9 wherein the zirconia contains about 12.4 w/o ytterbia.

* * * * *